US009533646B2

(12) United States Patent
Schneider

(10) Patent No.: US 9,533,646 B2
(45) Date of Patent: Jan. 3, 2017

(54) SAFETY RESTRAINT SYSTEM WITH INFLATABLE PELVIS RESTRAINT DEVICE

(71) Applicant: Autoliv ASP, Inc., Ogden, UT (US)

(72) Inventor: David W. Schneider, Waterford, MI (US)

(73) Assignee: AUTOLIV ASP, INC., Ogden, UT (US)

(*) Notice: Subject to any disclaimer, the term of this patent is extended or adjusted under 35 U.S.C. 154(b) by 76 days.

(21) Appl. No.: 14/470,001

(22) Filed: Aug. 27, 2014

(65) Prior Publication Data
US 2016/0059814 A1 Mar. 3, 2016

(51) Int. Cl.
B60R 21/207 (2006.01)
B60R 21/18 (2006.01)
B60N 2/68 (2006.01)
B60N 2/427 (2006.01)
B60R 22/26 (2006.01)
B60N 2/42 (2006.01)
B60R 21/01 (2006.01)

(52) U.S. Cl.
CPC ........... B60R 21/207 (2013.01); B60N 2/4221 (2013.01); B60N 2/42718 (2013.01); B60N 2/688 (2013.01); B60R 21/18 (2013.01); B60R 22/26 (2013.01); B60R 2021/01272 (2013.01); B60R 2022/263 (2013.01)

(58) Field of Classification Search
CPC ........ B60R 21/207; B60R 21/18; B60R 22/18; B60R 2022/1806; B60R 2021/01265; B60R 2021/01272; B60N 2/4263; B60N 2/42718

USPC ............................ 280/730.1; 297/216.1, 468
See application file for complete search history.

(56) References Cited

U.S. PATENT DOCUMENTS

| 4,015,860 | A | * | 4/1977 | Tisell | B60R 22/1951 280/806 |
|---|---|---|---|---|---|
| 6,050,635 | A | * | 4/2000 | Pajon | B60N 2/4221 297/216.1 |
| 6,715,788 | B2 | | 4/2004 | Saiguchi et al. | |
| 6,942,251 | B2 | * | 9/2005 | Birk | B60N 2/4221 280/806 |
| 7,328,945 | B2 | * | 2/2008 | Yoshikawa | B60N 2/42718 280/730.1 |
| 7,377,544 | B2 | * | 5/2008 | Itoga | B60N 2/42718 180/268 |
| 7,607,687 | B2 | | 10/2009 | Clute et al. | |
| 8,585,084 | B1 | | 11/2013 | Schneider | |

(Continued)

OTHER PUBLICATIONS

U.S. Appl. No. 14/483,672, filed Sep. 11, 2014.

Primary Examiner — Karen Beck
(74) Attorney, Agent, or Firm — Stephen T. Olson; Harness, Dickey & Pierce, P.L.C.

(57) ABSTRACT

A safety restraint system for a vehicle seat having a seat back, a seat cushion and a frame includes an inflatable pelvis restraint device having a flexible member extending laterally across the seat cushion and having a first end and a second end. The flexible member includes at least a portion that is inflatable for increasing a height of the seat proximate a forward edge of the seat. In one embodiment, both the first and second ends are attached to the frame. In another embodiment, the safety restraint system includes a continuous webbing that defines a pelvis restraint portion, a lap belt portion and a shoulder belt portion. The lap belt portion, the shoulder belt portion, or both may be additionally inflatable.

15 Claims, 10 Drawing Sheets

(56) References Cited

U.S. PATENT DOCUMENTS

| | | | |
|---|---|---|---|
| 8,678,510 B2* | 3/2014 | Masutani | B60R 22/1955 297/216.1 |
| 8,840,137 B2 | 9/2014 | Schneider et al. | |
| 8,864,168 B2* | 10/2014 | Ichida | B60R 21/18 280/733 |
| 2001/0011810 A1* | 8/2001 | Saiguchi | B60N 2/4221 280/728.1 |
| 2002/0067031 A1* | 6/2002 | Busgen | B60R 21/18 280/733 |
| 2002/0190515 A1* | 12/2002 | Birk | B60N 2/4221 280/753 |
| 2003/0230872 A1* | 12/2003 | Sakai | B60N 2/4221 280/728.1 |
| 2005/0184491 A1* | 8/2005 | Itoga | B60N 2/42718 280/730.1 |
| 2005/0189752 A1* | 9/2005 | Itoga | B60R 21/231 280/741 |
| 2006/0049617 A1* | 3/2006 | Mowry | B60R 21/207 280/730.2 |
| 2006/0208471 A1* | 9/2006 | Sundararajan | B60R 21/18 280/733 |
| 2009/0134612 A1* | 5/2009 | Itoga | B60N 2/42718 280/733 |
| 2009/0160167 A1* | 6/2009 | Itoga | B60R 21/18 280/733 |
| 2009/0273223 A1* | 11/2009 | Gomi | B60R 22/26 297/481 |
| 2009/0284066 A1* | 11/2009 | Higuchi | B60N 2/4221 297/468 |
| 2011/0241318 A1* | 10/2011 | Miyajima | B60N 2/002 280/730.1 |
| 2012/0193953 A1* | 8/2012 | Kino | B60N 2/42763 297/216.1 |
| 2013/0009391 A1* | 1/2013 | Miller | B60R 22/46 280/806 |
| 2013/0082457 A1* | 4/2013 | Hashido | B60R 21/207 280/730.1 |

* cited by examiner

SAFETY RESTRAINT SYSTEM WITH INFLATABLE PELVIS RESTRAINT DEVICE

FIELD

The present disclosure relates to safety restraint systems. More particularly, the present disclosure relates to a safety restraint system having an inflatable pelvis restraint device.

BACKGROUND

This section provides background information related to the present disclosure which is not necessarily prior art.

Various passive and active automotive occupant restraint systems are known for enhancing occupant protection in the event of a vehicle impact. Passive systems are deployed with no action required by the occupant and include inflatable restraints or airbags for frontal and side impacts, for example. Automatically deployed seat belt systems are known. Active systems, such as seat belts, have been used for many decades and are manually deployed by the occupant.

Conventional seat belt systems use three points of connection with the vehicle structure and incorporate a lap belt portion for engaging the occupant's lower torso and a shoulder belt portion for engaging the occupant's upper torso. When used, the seat belt restrains movement of the occupant in the event of a vehicle impact or rollover event. In order to enhance the comfort and convenience provided by the seat belt system, retractors are used which permit belt webbing to be extracted from and retracted into the retractor, allowing movement of the occupant while maintaining the belt in close contact with the occupant.

A more recent development in the area of seat belt systems is that of the so-called inflatable seat belt. An inflatable seat belt system incorporates a section of the shoulder or lap belt section which is inflated by a gas. The shoulder or lap belt section is typically inflated by a pyrotechnic inflator to increase its size and volume. Thus, when an inflatable seat belt is deployed, the normally narrow seat belt webbing expands significantly to reduce the contact pressure between the belt and the occupant during an impact event. Inflatable seat belts are typically deployed using the crash sensing systems also used to deploy other inflatable restraint systems upon the detection of a vehicle impact or rollover event having predetermined dynamic characteristics.

Another more recent development in the area of safety restraints relates to pelvis restraint. An inflatable airbag may be disposed below a seat cushion. The airbag may be activated upon sensing predetermined dynamic characteristics of the vehicle (e.g., an actual or impending impact or rollover event. The airbag typically applies an upward directed force to the seat cushion which is opposed by a reactionary surface.

While known safety restraint systems have generally proven to be acceptable for their intended uses, a continuous need for improvement exists in the relevant art.

SUMMARY

This section provides a general summary of the disclosure, and is not a comprehensive disclosure of its full scope or all of its features.

In accordance with one aspect, the present teachings provide a safety restraint system in combination with a vehicle seat. The vehicle seat includes a seat having a frame, a seat back, and a seat cushion supported on the frame. The safety restraint system includes an inflatable pelvis restraint device having a flexible member extending laterally across the seat cushion and having a first end and a second end. The first and second ends are attached to the frame. The flexible member includes at least a portion that is inflatable for increasing a height of the seat proximate a forward edge of the seat.

In accordance with another aspect, the present teachings provide a safety restraint system in combination with a vehicle seat. The seat includes a frame, a seat back and a seat cushion supported on the frame. The safety restraint system includes a continuous webbing having a first end and a second end. A first bracket secures the first end to the frame proximate a first lateral side of the seat. A second bracket slidably retains a portion of the continuous webbing to the frame proximate a second lateral side of the vehicle seat. A tongue is carried by the continuous webbing. A buckle for receiving the tongue is disposed proximate the first lateral side of the seat. The continuous webbing defines a pelvis restraint portion between the first and second brackets, a lap belt portion between the second bracket and the tongue and a shoulder belt portion between the tongue and the second end. The pelvis restraint portion is inflatable.

In accordance with yet another aspect, the present teachings provide a safety restraint device for a seat having a seat back, a frame and a seat cushion. The safety restraint device includes a continuous webbing defining a pelvis restraint portion, a lap belt portion and a shoulder belt portion. The pelvis restraint portion is inflatable and adapted to extend across the seat cushion between a first lateral side of the seat and a second lateral side of the seat. The lap belt portion is adapted to be positioned above the seat cushion and extend across the seat from the second lateral side to the first lateral side. The shoulder belt portion adapted to extend from the first lateral side to the second lateral side.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
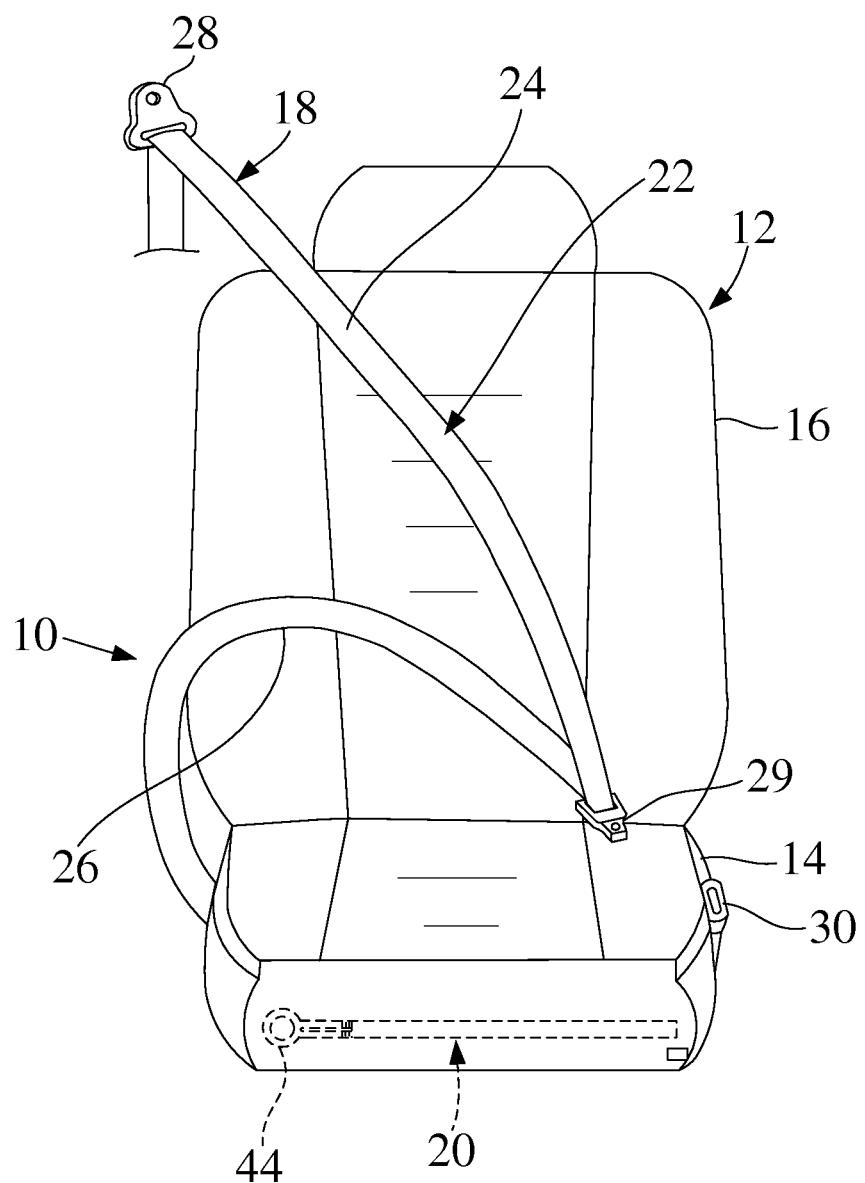
FIG. 1 is a front view of a restraint system in accordance with the present teachings and including an inflatable pelvis restraint, the restraint system shown operatively associated with a seat.

Example embodiments will now be described more fully with reference to the accompanying drawings.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that the example embodiment should not be construed to limit the scope of the present disclosure. Well-known processes, well-known device structures, and well-known technologies are not described herein in detail.

With initial reference to FIGS. 1 through 5, a restraint system constructed in accordance with the present teachings is illustrated and generally identified at reference character 10. The restraint system 10 is shown operatively associated with a seat 12 of a motor vehicle. It will be understood that the particular seat 12 illustrated is merely exemplary. In this regard, the present teachings may be adapted to various other seats. For example, the present teachings may be adapted for use in front or rear seats in motor vehicles. The present teachings may also be adapted for use in aviation and other seating environments. Briefly, the seat 12 is illustrated to generally include a lower seat cushion 14 and an upwardly extending seat back 16.

The restraint system 10 is illustrated to generally include a seat belt system 18 and an inflatable pelvis restraint device 20. In this embodiment, the seat belt system 18 and the inflatable pelvis restraint device 20 cooperate with one another but are otherwise independent from each other. As will be seen in connection with the second embodiment to be described below, however, the seat belt system 18 and the inflatable pelvis restraint device 20 may alternatively share a common belt or webbing.

The seat belt system 18 generally includes a webbing 22 having an upper shoulder belt portion 24 and a lower lap belt portion 26. The shoulder belt portion 24 may pass through a "D" ring 28 which is typically mounted to the "B" pillar of the motor vehicle (the vertical structural member separating the front and rear doors of a four-door vehicle). A seat belt latch plate or tongue 29 is slidably carried by the seat belt webbing 22 and is received by a seat belt buckle 30. The seat belt buckle 30 may be attached to the vehicle floor pan or the seat 12 in a conventional manner.

In a conventional manner, a first free end of the webbing 22 may be anchored to the seat 12 or floor pan of the vehicle and a second free end of the webbing 22 may be associated with a retractor. One suitable retractor is shown and described in commonly assigned U.S. Pat. No. 7,607,687. U.S. Pat. No. 7,607,687 is hereby incorporated by reference as if fully set forth herein.

The inflatable pelvis restraint device 20 includes an inflatable member 32. The inflatable member 32 will be understood to be flexible and may be a belt or webbing. By describing the inflatable pelvis restraint device 20 or the inflatable member 32 as flexible, it will be understood that the belt or webbing 22 is completely constructed of a flexible material (i.e., a material that is not shape retaining) such as a woven material. For example, the webbing 22 may be woven from conventional materials suitable for airbags or seatbelts. Again, the webbing 22 does not include any memory retaining materials such as metal or the like. The webbing 32 may include a portion (e.g., a central portion) that is inflatable or may be inflatable substantially along its entire length. The webbing 32 may be an inflatable tubular webbing. Alternatively, the inflatable pelvis restraint device 20 may include an inflatable cushion folded within a tubular webbing or non-tubular webbing.

The webbing 32 may extend at least substantially across a lateral width of the seat 12. As illustrated, the webbing 32 may be located within the foam of the cushion 14 of the seat 12. In this regard, the webbing 32 may be disposed within a channel or slot defined in the foam cushion 14. Alternatively, the webbing 32 may be located below the foam cushion 14 or between the foam cushion 14 and a seat cover material. In any event, the webbing 32 may be positioned proximate a forward edge of seat 12 such that the inflatable pelvis restraint device 20 functions to increase a height of the seat 12 proximate the forward edge upon inflation.

Figure 3:
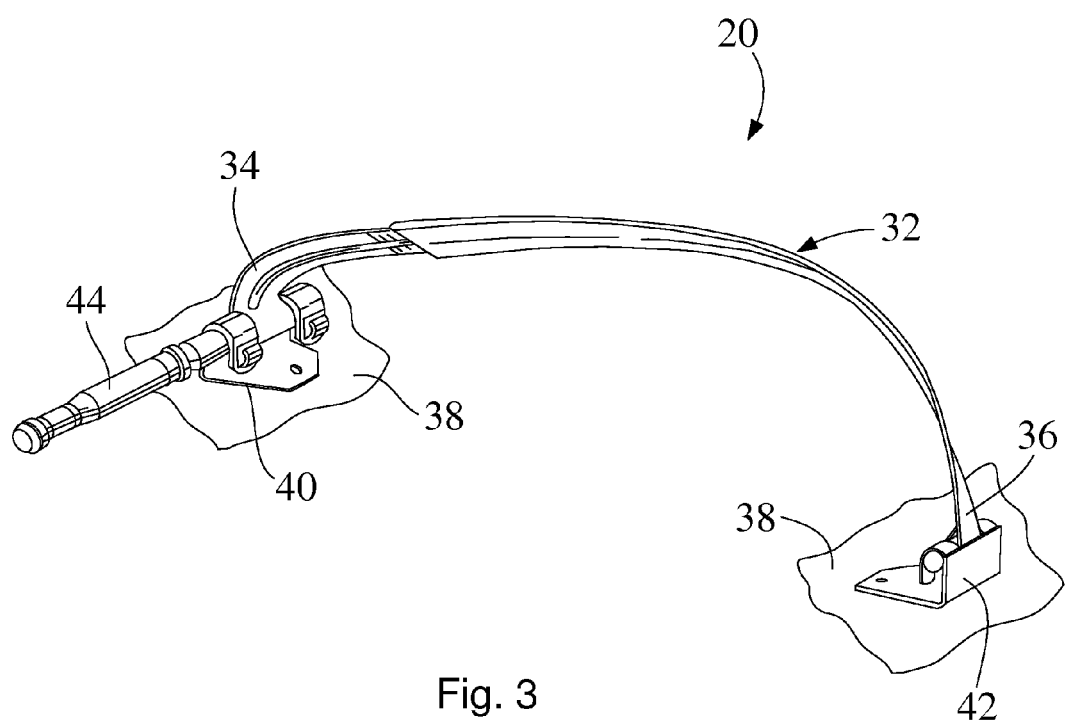
FIG. 3 is a perspective view of the inflatable pelvis restraint of FIG. 1 shown removed from the seat for purposes of illustration.

As perhaps most particularly shown in FIG. 3, the webbing 32 includes first and second ends 34 and 36. In the embodiment illustrated, both of the ends 34 and 36 are securely attached to a frame 38 of the seat 12 through suitable brackets 40 and 42, respectively. The bracket 40 may be associated with an inflator 44. In a known manner, the inflator 44 is in fluid communication with the inflatable portion of the webbing 32. As illustrated, the inflator 44 is thereby attached to the frame 38 of the seat 12. Alternatively, the inflator 44 may be attached to the floor pan or other structure of the vehicle in any manner well known in the art.

The present teachings may be adapted for use with any inflator 44 capable of supplying a source of gas to the inflatable portion of the webbing 32 in response to sensing of a predetermined vehicle condition. Suitable inflators are commercially available from the assignee of this application. A vehicle restraint system controller (not shown) may automatically send signals to actuate the inflator 44 to inflate the pelvis restraint device 20. Details of the inflator 44 and the vehicle restraint system controller are beyond the scope of the present teachings and will be readily apparent to those of ordinary skill in the art.

Figure 2:
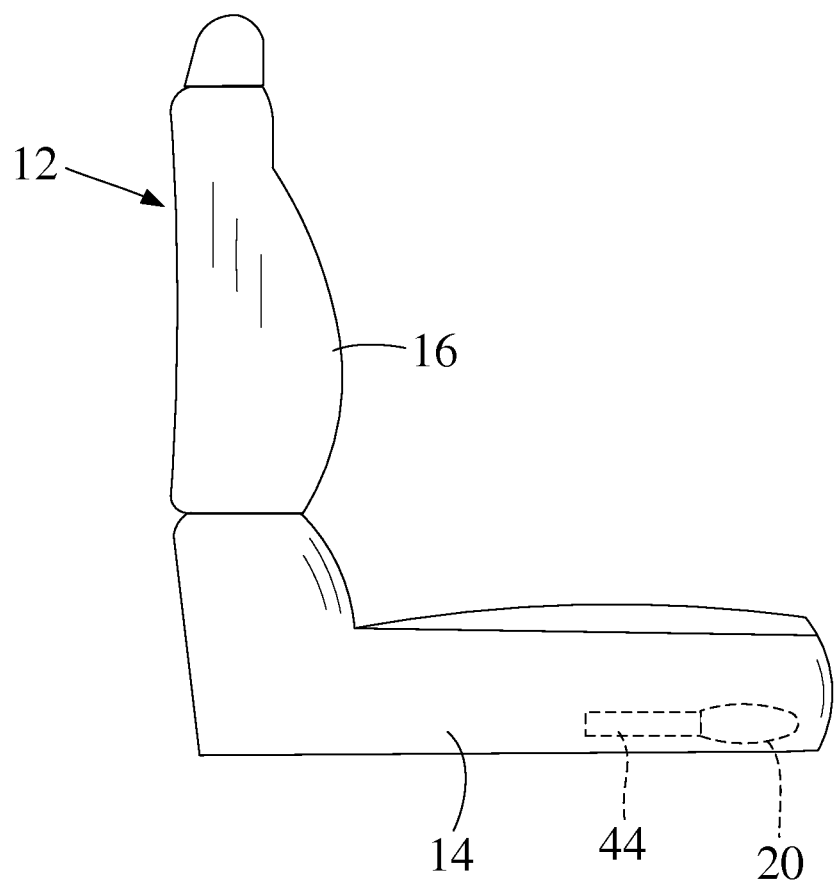
FIG. 2 is a side view of the inflatable pelvis restraint and seat of FIG. 1.
Figure 4:
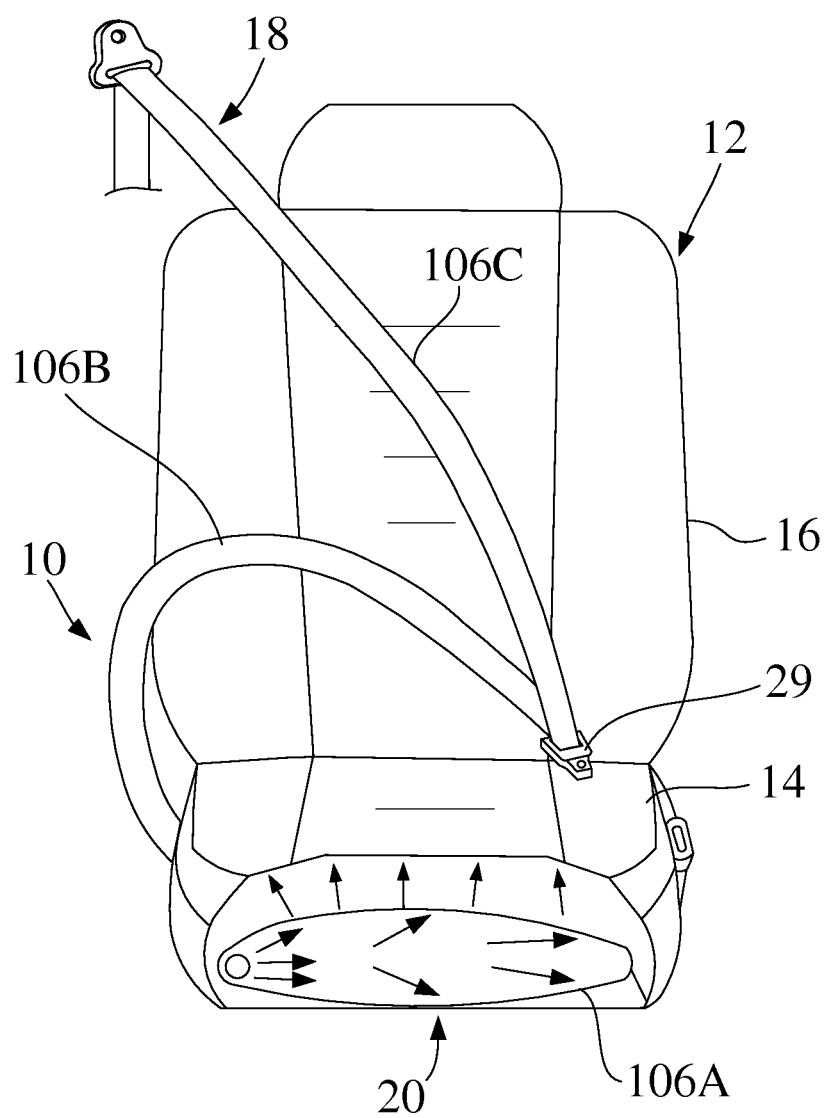
FIG. 4 is a front view similar to FIG. 1, shown partially cut away and illustrating the inflatable pelvis restraint upon inflation.
Figure 5:
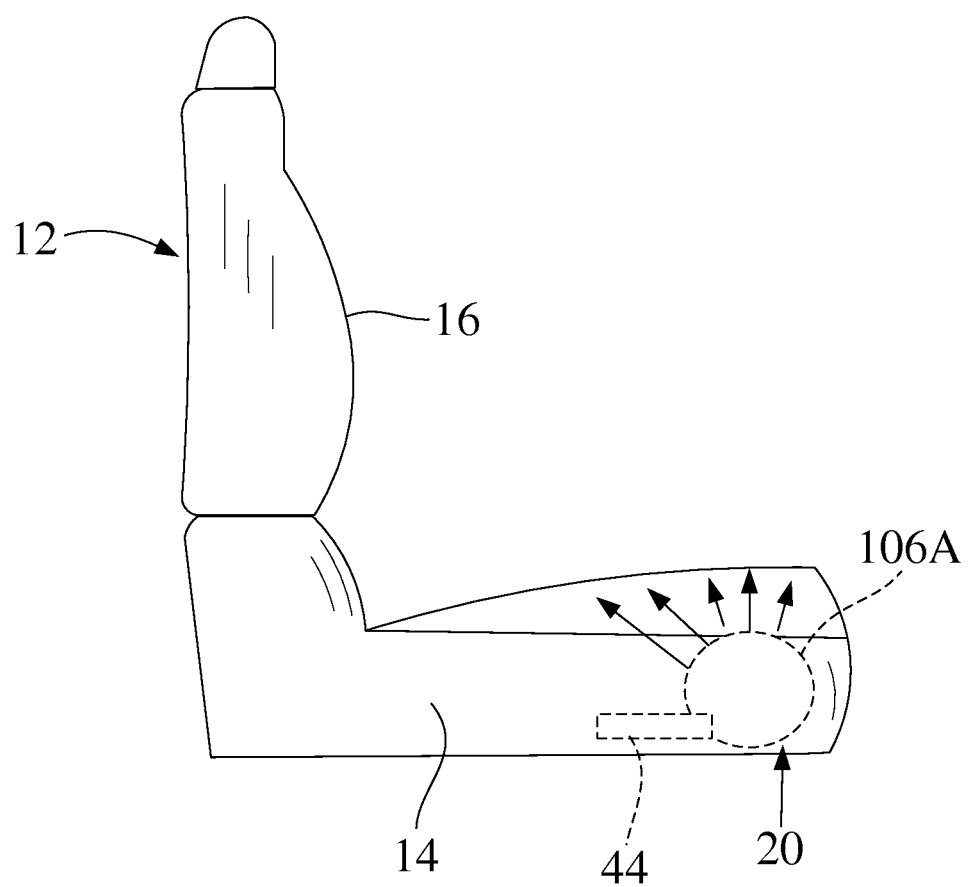
FIG. 5 is a side view similar to FIG. 2, illustrating the inflatable pelvis restraint upon inflation.

Upon sensing of a predetermined vehicle condition, the vehicle restraint system controller actuates the inflator 44 to inflate the pelvis restraint device 20. A non-activated or uninflated condition of the pelvis restraint device 20 is shown in FIGS. 1, 2 and 3. An actuated or inflated condition of the pelvis restraint device 20 is shown in FIGS. 4 and 5.

Upon inflation, the webbing 32 (or inflatable cushion within the webbing) is pressurized. In the embodiment illustrated, the inflated device 20 has a generally tubular shape. It will be understood, however, that the present teachings are not limited to any particular shape. Inflation of the pelvis restraint device 20 operates to increase cushion stiffness across the width of the seat 12, increase an angle of the seat cushion 14 to provide improved restraint for the pelvis of the occupant, and reduce a potential for an occupant of the seat to submarine relative to the seat belt system 18.

Figure 6:
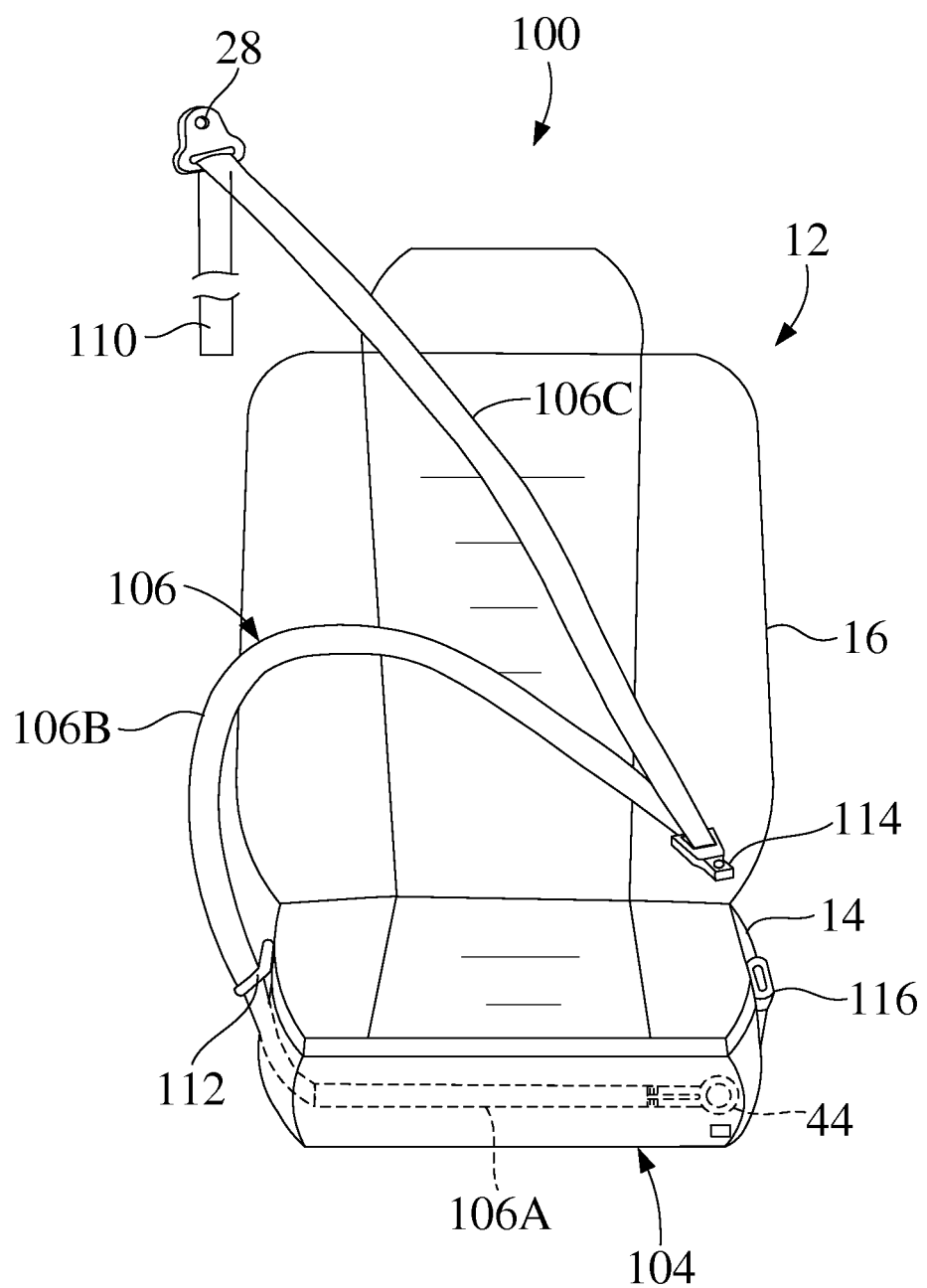
FIG. 6 is a front view of another restraint system in accordance with the present teachings, the restraint system including a continuous webbing having an inflatable pelvis restraint portion, the restraint system shown operatively associated with a seat.
Figure 7:
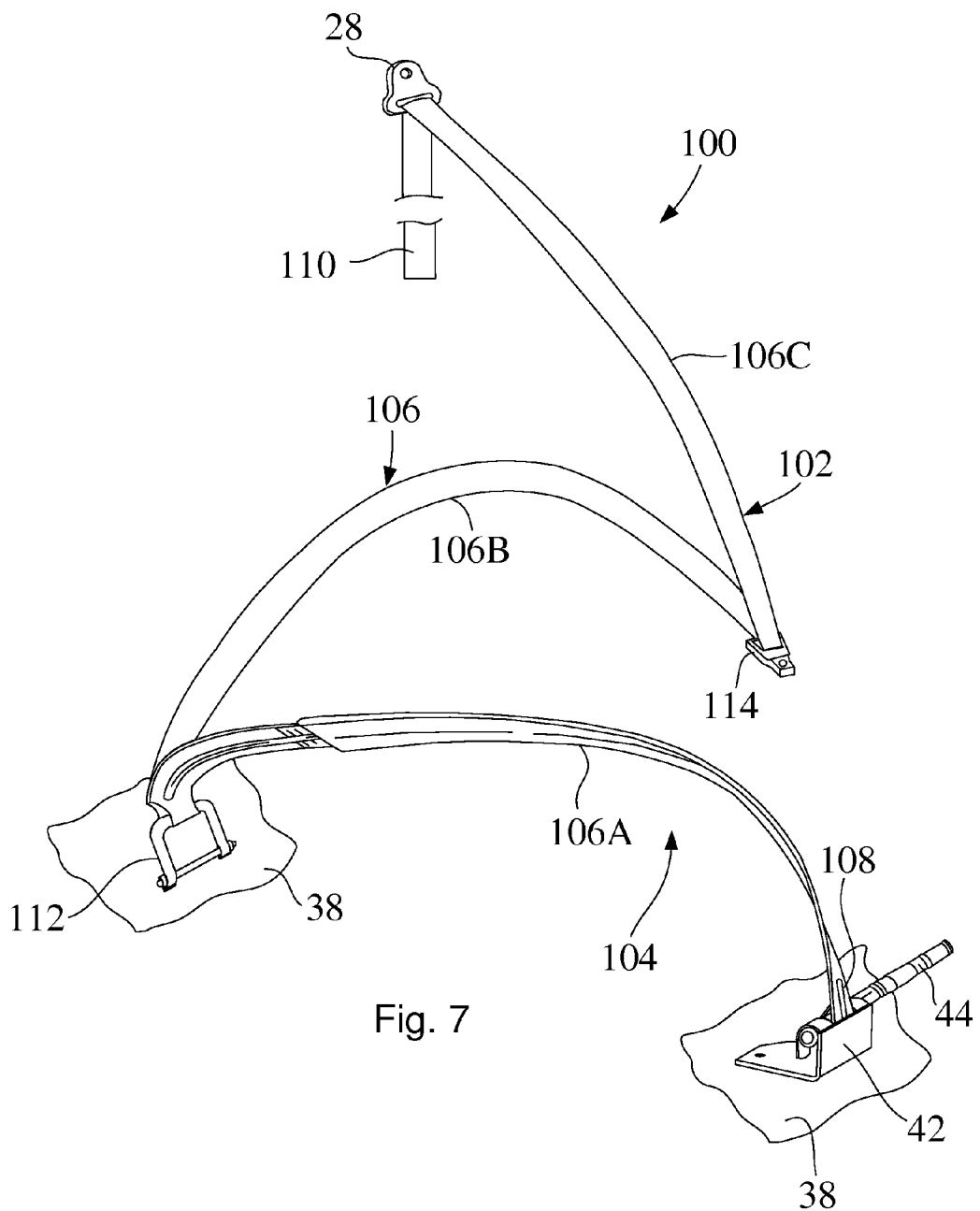
FIG. 7 is a perspective view of the restraint system of FIG. 6 shown removed from the seat for purposes of illustration.
Figure 8:
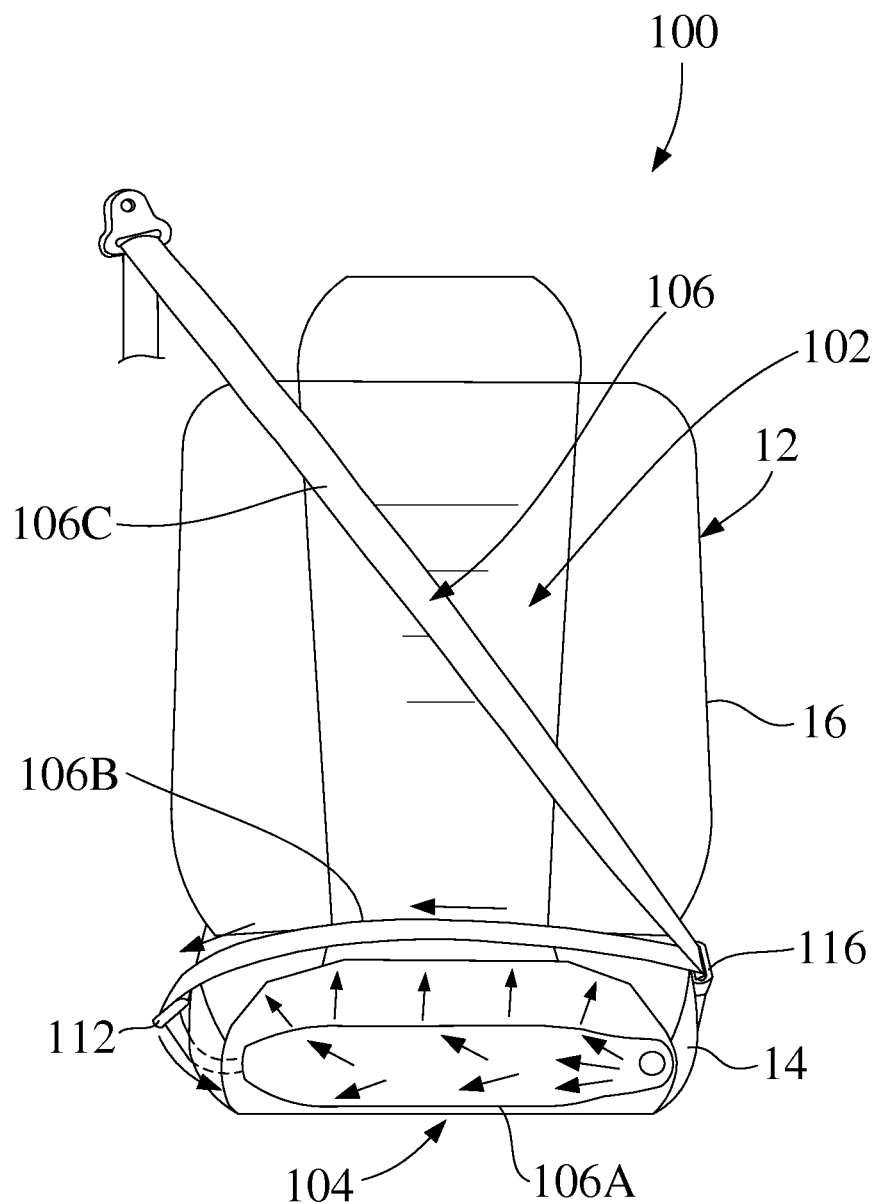
FIG. 8 is a front view similar to FIG. 6, shown partially cut away and illustrating the inflatable pelvis restraint upon inflation.

Turning to FIGS. 6 through 8, another restraint system constructed in accordance with the present teachings is illustrated and identified at reference character 100. As with the restraint system 10, the restraint system 100 includes a seat belt system 102 and an inflatable pelvis restraint device 104. In this embodiment, the seat belt system 102 and the inflatable pelvis restraint device 104 share a common and continuous webbing 106. Given the similarities between the restraint systems 10 and 100, common reference characters will be used throughout the various views to identify similar elements.

The continuous webbing 106 includes a first end 108 and a second end 110. As will become more apparent below, the continuous webbing 106 is illustrated to include a first portion or pelvis restraint portion 106A, a second portion or lap belt portion 106B, and a third portion or shoulder belt portion 106C. The term "continuous" used to describe the webbing 106 is intended to mean that the webbing is continuous from the first end 108 to the second end 110. It will be understood that the term "continuous" does not limit the webbing 106 to construction from a common material. In this regard, the continuous webbing 106 may be constructed of various materials sewn or otherwise suitably fastened to one another along the length of the continuous webbing 106.

The first end of the continuous webbing 106 may be secured to the frame 38 proximate a first lateral side of the seat 12 with a bracket 42. The pelvis restraint portion 106A of the continuous webbing 106 may extend at least substantially across a lateral width of the seat 12. In this regard, the continuous webbing 106 may be disposed within a channel or slot defined in the foam cushion 14. Alternatively, the continuous webbing 106 may be located below the foam cushion 14 or between the foam cushion 14 and a seat cover material.

The pelvis restraint portion 106A will be understood to be flexible. As above, the term "flexible" is intended to mean that the pelvis restraint portion 106A is completely constructed of a flexible material. Again, the pelvis restraint portion 106A may be woven from conventional materials suitable for airbags or seatbelts. The pelvis restraint portion does not include any memory retainer materials such as metal or the like. The remainder of the continuous webbing 106 is also flexible and may be woven of conventional seat belt material.

The continuous webbing 106 may include a portion (e.g., a central portion) that is inflatable or may be inflatable substantially along its entire length. The continuous webbing 106 may be an inflatable tubular webbing. Alternatively, the inflatable pelvis restraint portion 106A may include an inflatable cushion folded within a tubular webbing.

A second bracket 112 slidably retains the continuous webbing 106 proximate a second lateral side of the seat 12. The second bracket 112 may be a D-ring and may be secured to the frame 38 of the seat. Alternatively, the second bracket 112 may be secured to the floor pan or other vehicle structure. Alternatively, a third (or more) brackets may be used to slidably retain and guide the continuous webbing.

The lap belt portion 106B of the continuous webbing 106 is adjustable in length and extends between the second bracket 112 and a latch plate or tongue 114 slidably carried along the length of the continuous webbing 106. The tongue 114 may be received by a seat belt buckle 116 in a conventional manner. The seat belt buckle 116 may be attached to the vehicle floor pan or the seat 12 in a conventional manner.

The shoulder belt portion 106C of the continuous webbing 106 is similarly adjustable in length. The shoulder belt portion 106C extends from the tongue 114 to the D-ring 28. From the D-ring, the continuous webbing 106 may downwardly extend to a conventional retractor.

The restraint system 100 further includes an inflator 44. The inflator 44 may be in fluid communication with the pelvis restraint portion 106A of the continuous webbing 106. As shown in FIG. 7, the inflator 44 may be secured to the frame 38 of the seat 12 with the bracket 42. Alternatively, the inflator 44 may be attached to the floor pan or other structure of the vehicle in any manner well known in the art.

Upon sensing of a predetermined vehicle condition, the vehicle restraint system controller actuates the inflator 44 to inflate the pelvis restraint portion 106A of the continuous webbing 106. A non-activated or uninflated condition of the pelvis restraint portion 106A is shown in FIGS. 6 and 7. An actuated or inflated condition of the pelvis restraint portion 106A is shown in FIG. 8.

Upon actuation of the inflator 44, the webbing (or inflatable cushion within the tubular webbing) of the pelvis restraint portion 106A is pressurized and resultantly expands outwardly and upwardly. In the embodiment illustrated, the inflated device has a generally tubular shape. It will be understood, however, that the present teachings are not limited to any particular shape. Inflation of the pelvis restraint portion 106A operates to increase cushion stiffness across the width of the seat 12, increases an angle of the seat cushion 14 to provide improved restraint for the pelvis of the occupant, and reduces a potential for the seat occupant to submarine relative to the lap belt portion 106B of the continuous webbing 106. In addition, inflation of the pelvis restraint portion 106A provides pre-tensioning of the continuous webbing 106 (see the arrows in FIG. 8 along the length of the continuous webbing 106) as the pelvis restraint portion 106A expands upwardly and outwardly.

Figure 9:
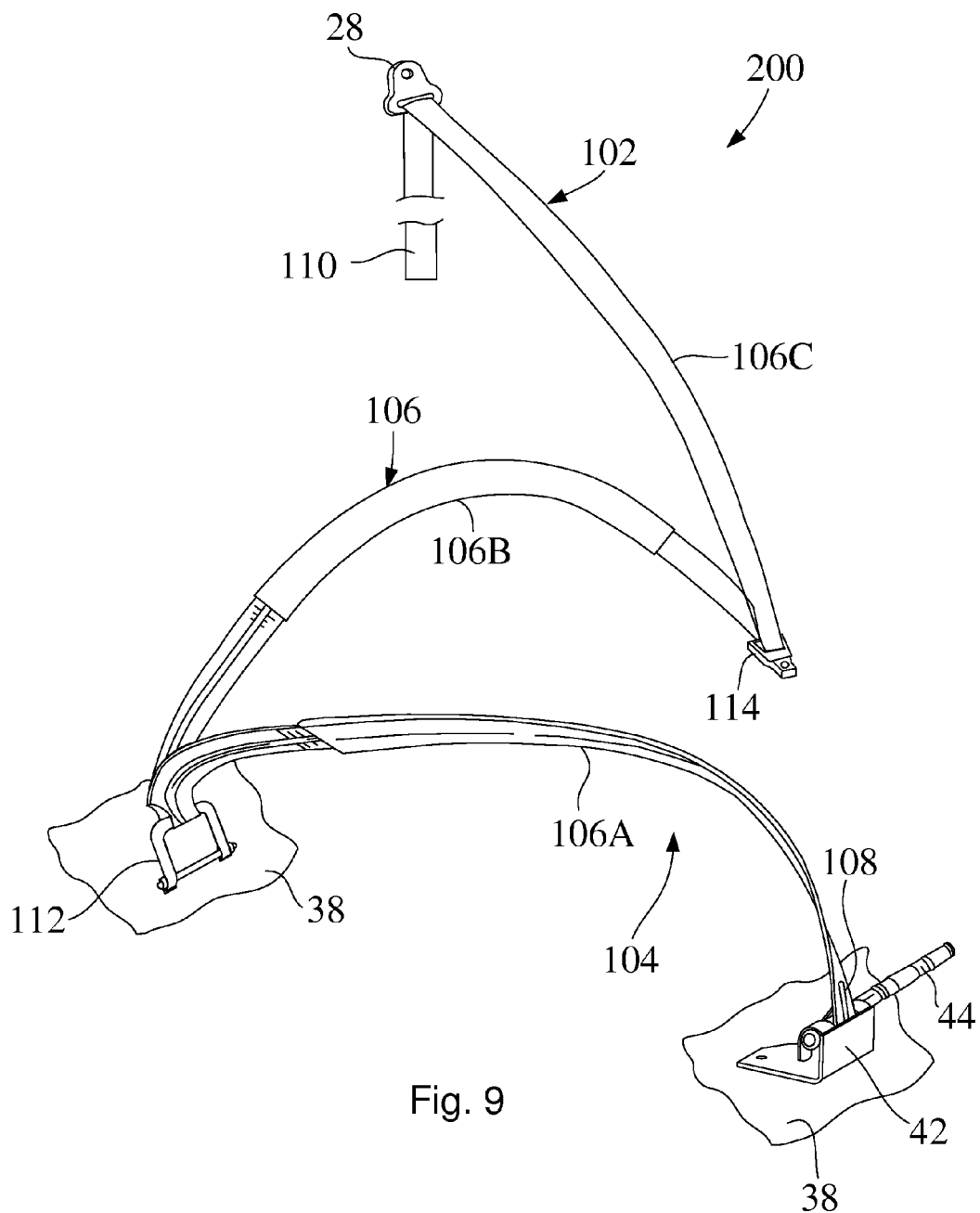
FIG. 9 is a perspective view similar to FIG. 7 illustrating another restraint system in accordance with the present teachings, the restraint system including a continuous webbing having both an inflatable pelvis restraint portion and an inflatable lap belt portion, the inflatable pelvis restraint portion and the inflatable lap belt portion shown prior to inflation.
Figure 10:
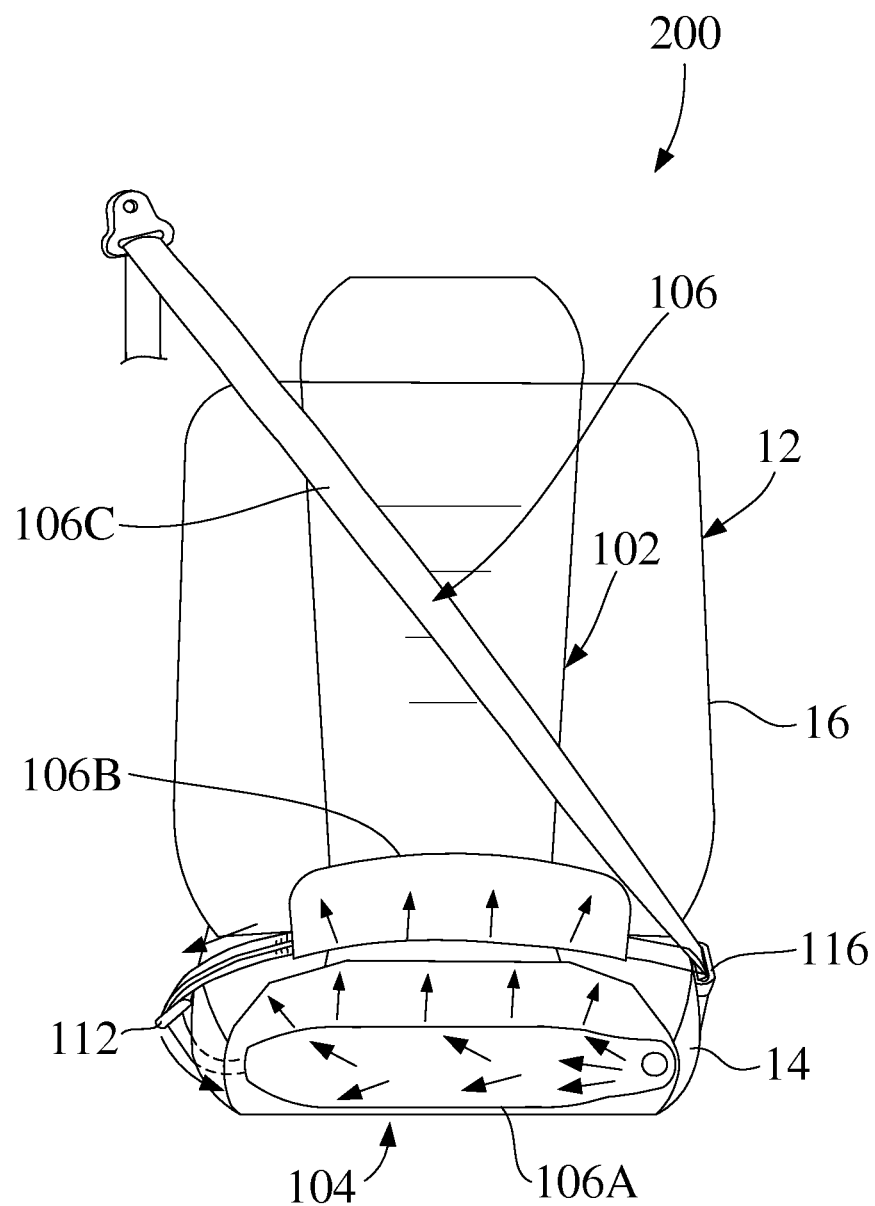
FIG. 10 is a front view of the restraint system of FIG. 9 shown operatively associated with a partially cut away seat and shown with both the inflatable pelvis restraint portion and the inflatable lap belt portion in their inflated states.

With reference now to FIGS. 9 and 10, another restraint system in accordance with the present teachings is illustrated and identified at reference character 200. As with the restraint system 100, the restraint system 200 generally includes a seat belt system 102 and an inflatable pelvis restraint device 104. Given the similarities between the restraint systems 100 and 200, common reference characters will be used throughout the various views to identify similar elements.

With the restraint system 100 illustrated above, inflation of the continuous webbing 106 is limited to the pelvis restraint portion 106A. The restraint system 200 differs from the restraint system 100 in that the lap belt portion 106B is also inflatable. FIG. 9 illustrates the lap belt portion 106B and pelvis restraint portion 106A prior to inflation. FIG. 10 illustrates the lap belt 106B and pelvis restraint portion 106A after inflation. It will be understood that the shoulder belt portion 106C may similarly be inflatable.

As illustrated, the lap belt portion 106B and the pelvis restraint portion 106A are inflated by a common inflator 44. In this regard, gas from the inflator 44 travels through a conduit or hose carried by the pelvis restraint portion 106A. The conduit may continue from the pelvis restraint portion 106A through the D-ring 112 and to the lap belt portion 106B. It will be appreciated that the restraint system 200 may alternatively include distinct inflators for the pelvis restraint portion 106A and the lap belt portion 106B. It will also be appreciated that the scope of the present teachings does not depend on any particular location of the inflator(s). For example, inflation may alternatively be from the shoulder belt portion 106C down into the lap belt portion 106B and the pelvis restraint portion 106C. The inflator(s) may be mounted in a pillar, rear shelf, seat back or any other suitable location.

It will now be appreciated that the present teachings provide various embodiments of an inflatable pelvis restraint device that do not rely upon a seat pan or other structure below the device for a reaction surface. Rather, the present teachings rely on tension in the belt or webbing. The less rigid structure of the present teachings provides a softer seat for the occupant.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A safety restraint system in combination with a vehicle seat comprising:
    a seat including a frame, a seat back and a seat cushion supported on the frame;
    a continuous webbing including a first end and a second end;
    a first bracket securing the first end to the frame proximate a first lateral side of the seat;
    at least one additional bracket slidably retaining a portion of the continuous webbing to the frame proximate a second lateral side of the vehicle seat;
    a tongue carried by the continuous webbing;
    a buckle for receiving the tongue, the buckle disposed proximate the first lateral side of the seat;
    the continuous webbing defining a pelvis restraint portion between the first and the at least one additional bracket, a lap belt portion between the at least one additional bracket and the tongue and a shoulder belt portion between the tongue and the second end, the pelvis restraint portion being inflatable.

2. The safety restraint system of claim 1, wherein the continuous webbing continuously extends from the first end to the second end and defines each of the pelvis restraint portion, the lap belt portion and the shoulder belt portion along a length thereof between the first and second ends.

3. The safety restraint system of claim 1, wherein the continuous webbing is flexible.

4. The safety restraint system of claim 1, wherein inflation of the pelvis restraint portion pretensions the continuous webbing.

5. The safety restraint system of claim 1, further comprising an inflator for inflating the pelvis restraint portion.

6. The safety restraint system of claim 1, wherein at least one of the lap belt portion and the shoulder belt portion is inflatable.

7. A safety restraint device in combination with a seat having a seat back, a frame and a seat cushion, the safety restraint device comprising:
    a continuous webbing having a first end and a second end, the continuous webbing defining a pelvis restraint portion, a lap belt portion and a shoulder belt portion;
    the pelvis restraint portion being inflatable and adapted to extend across the seat cushion between a first lateral side of the seat and a second lateral side of the seat;
    the lap belt portion adapted to be positioned above the seat cushion and extend across the seat from the second lateral side to the first lateral side; and the shoulder belt portion adapted to extend from the first lateral side to the second lateral side, wherein inflation of the pelvis restraint portion pretensions the continuous webbing, and wherein the first end of the continuous webbing is fixedly secured to the frame.

8. The safety restraint device of claim 7, wherein the continuous webbing continuously extends from the first end to the second end and defines each of the pelvis restraint portion, the lap belt portion and the shoulder belt portion along a length thereof between the first and second ends.

9. The safety restraint device of claim 7, wherein the continuous webbing is flexible.

10. The safety restraint device of claim 7, wherein at least one of the lap belt portion and the shoulder belt portion is inflatable.

11. The safety restraint system of claim 1, wherein the buckle is mounted relative to the seat and mounted independent from the continuous webbing.

12. The safety restraint system of claim 1, wherein the first end of the continuous webbing is fixedly secured directly to the first bracket.

13. A safety restraint system in combination with a vehicle seat comprising:

a seat including a frame, a seat back and a seat cushion supported on the frame;

a continuous webbing including a first end fixedly secured relative to the seat and a second end;

a tongue carried by the continuous webbing;

a buckle for receiving the tongue, the continuous webbing defining a pelvis restraint portion disposed below the seat cushion, a lap belt portion between the pelvis restraint portion and the tongue and a shoulder belt portion between the tongue and the second end, the pelvis restraint portion being inflatable.

14. The safety restraint system of claim 13, further comprising a first bracket securing the first end to the frame proximate a first lateral side of the seat.

15. The safety restraint system of claim 13, further comprising at least one additional bracket slidably retaining a portion of the continuous webbing to the frame proximate a second lateral side of the vehicle seat.

\* \* \* \* \*